Nov. 23, 1965    B. C. KIERULF    3,218,981
DEVICE FOR STABILISING A ROTATABLE BODY
Filed July 15, 1963
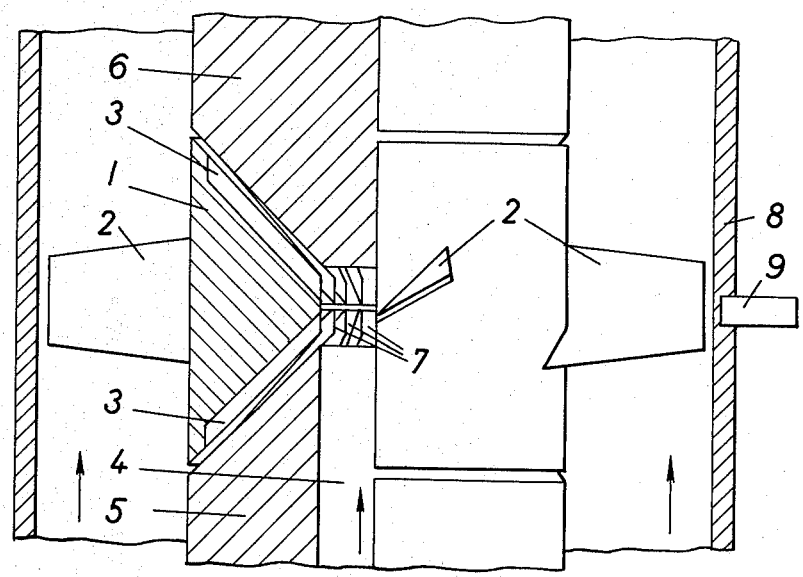
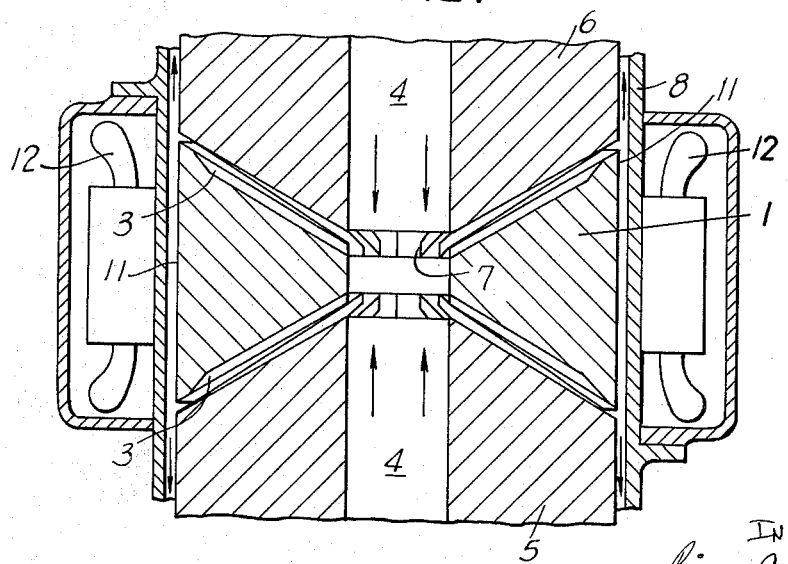

United States Patent Office 3,218,981
Patented Nov. 23, 1965

3,218,981
DEVICE FOR STABILISING A ROTATABLE BODY
Birger Christian Kierulf, P.O. Box 40, Kjeller by Lillestrom, Norway
Filed July 15, 1963, Ser. No. 294,938
Claims priority, application Norway, July 18, 1962, 145,143
3 Claims. (Cl. 103—87)

The present invention relates to a device for stabilising a body which is positioned in a liquid flow conduit and which is capable of rotating in the same with its axis of rotation coinciding with the main direction of the liquid flow.

The device according to the invention is particularly adapted for use in measuring liquid velocities or in pumping of liquid volumes through inaccessible tubings.

The purpose of the invention is to avoid the use of conventional bearings such as oil or water lubricated bearings, ball bearings or the like.

The device according to the invention comprises a pair of stationary bodies mounted in spaced relation to either end surface of the rotatable body in the said direction flow and each having a surface facing the adjacent surface of the rotatable body of essentially corresponding shape as the latter, so as to make adjacent surfaces define a narrow slot extending between the rotatable body and either of the two stationary bodies substantially radially to the said axis of rotation, the said rotatable body and at least one of the said two stationary bodies being provided with at least one bore extending generally parallelly to the said axis of rotation and the surfaces of the said rotatable body facing the slots having a substantially ribbed configuration wherein each rib extends substantially radially to the said axis of rotation.

The essential characteristic of the device according to the invention is that the rotatable body, when rotating is in itself building up a stabilising hydraulic pressure due to the centrifugal forces acting upon the liquid when the same is passed by the ribs towards the circumference of the rotatable body. Thus, the liquid pressure stabilises the rotatable body in such a manner that the same, when rotating at a speed exceeding a predetermined value, is out of contact with the stationary bodies and is freely rotating in the liquid.

Of the advantages of the device according to the invention, the following may be mentioned:

(1) There is no mechanical contact between the rotatable body and the stationary bodies under rotation above a predetermined speed, and the mechanical wear due to the contact is eliminated above that speed.

(2) The rotatable body can be included in systems wherein conventional bearings could not be used.

(3) The rotatable body can be included in radioactive or other inaccessible systems which have to be kept closed.

Two examples of the device according to the invention are now to be described with reference to the accompanying drawings, wherein:

FIGURE 1 illustrates a propeller to be used in measuring liquid velocities.

FIGURE 2 illustrates an enclosed device to be used for pumping liquid volumes.

Figure 3:
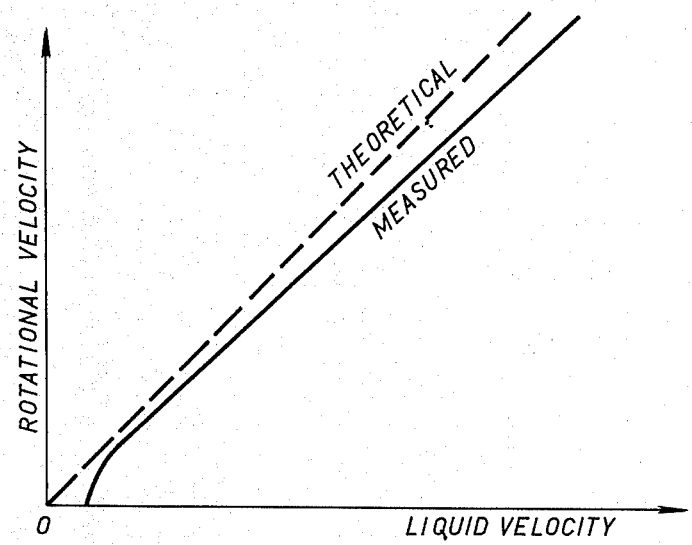
FIGURE 3 is a graph showing measured and calculated rotational speed in dependence of the liquid velocity and FIGURE 4 is a graph showing the stabilising process of a rotating body at increasing rotational speed.

In FIGURE 1, 1 is a propeller which is built in between two stationary bodies 5 and 6. The propeller is provided with a cylindrical circumference and blades 2 in the liquid flow which passes through a tubing 8. The two end faces of the propeller are of conical shape and provided with radial ribs 3 having intermediate grooves 7. The stationary bodies are mounted to either sides of the propeller, their end faces being concave or convex conically shaped. Between the ribs and the stationary bodies, there is a narrow slot. Liquid is supplied to the center part of the propeller through a bore 4 in the stationary body 5. When the liquid is flowing past the blades 2 and causes the propeller to rotate, the liquid supplied is, due to the centrifugal force, thrown outwardly along the grooves and in the slots between the ribs and the stationary bodies. In each slot, a liquid pressure is built up, a pressure which increases if the slot is reduced, and at convexly or concavely formed propeller side faces, the pressure will stabilise the propeller and cause the same to rotate without being mechanically supported on any solid bearing surface.

A propeller having a diameter of 35 mm., a clearance between ribs and the stationary body of about 0.2 mm., and a rib angle to the axis of rotation of about 45° and having 24 radial ribs of a width of 1.5 mm. and a depth of 1.5 mm., has been found to operate satisfactorily when the propeller was tested with water as the liquid.

One or more propeller blades may be made wholly or in part of a magnetic material. The magnetic pulses received by a coil 9 when the propeller is rotating may be transformed into electric pulses and provide an accurate measure of the flow velocity through the tubing 8.

In FIGURE 2, 1 is again a rotatable body provided with fins 3, on two concave or convex conical end faces facing the corresponding conically formed end faces of two stationary bodies 5 and 6. In FIGURE 2, the body 1 is shown as positioned in a liquid carrying tubing 8 and both stationary members 5 and 6 are provided with a liquid carrying bore 4 coaxial with the rotatable body 1. The circumference of the rotatable body 1 is provided with copper rods or the like 11, and a stator winding 12 is positioned on the outside of the tube wall 8. The body 1 is then acting as the rotor of a squirrel cage motor.

When the stator winding 12 is connected to a suitable source of current, the rotor 1 will commence to rotate. Due to the rotation, liquid from the bores 4 is thrown outwardly between the bodies 5, 6 and the body 1 towards the circumference of the rotor 1. When the rotor has obtained a predetermined speed, the liquid pressure in the slots between the rotor 1 and the stationary bodies 5 and 6, respectively will stabilize the rotor 1. The liquid is thrown outwardly and is forced along the tube wall 8 and fresh liquid is sucked towards the axis of the rotor through the bores 4 of the stationary bodies. The assembly shown in FIGURE 2 is then operating as a built-in pump and the arrows indicate the directions along which the liquid is caused to flow.

The rotational velocity of a propeller as shown in FIGURE 1 was experimentally measured at determined liquid velocities and the results are shown graphically in FIGURE 3, together with the theoretical rotational velocity shown as a function of the liquid velocity. As shown in the graph, the liquid must initially acquire a certain velocity before the propeller commences to rotate, but from then on the rotation is quickly increasing towards the theoretical value, whereupon the rotational velocity as measured is very nearly the theoretical rotational velocity.

The stabilizing effect would depend on the diameter and rotational velocity of the propeller, the specific gravity of the liquid, the shape of the slot between the ribs of the propeller and the stationary body, the design of the ribs, the weight of the propeller, the buoyance and friction between liquid and propeller.

Figure 4:
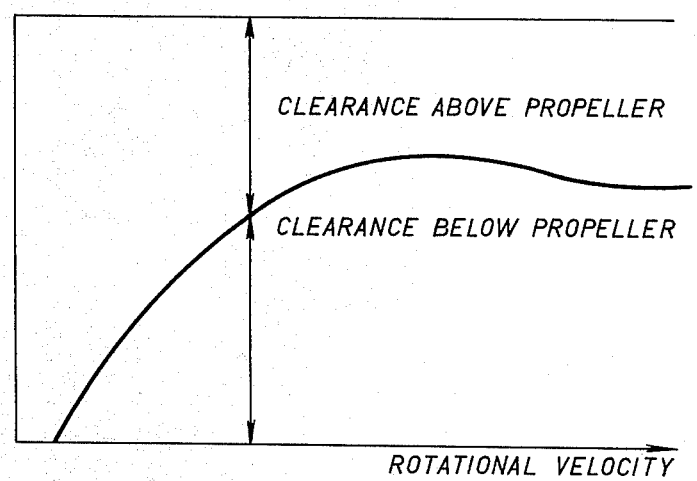

FIGURE 4 illustrates the stabilisation process of a propeller as shown in FIGURE 1. The propeller is positioned in a vertical tubing and is initially supported by the lower stationary body. As the rotational velocity increases, the propeller is, however, upon being lifted from the support, quickly raising towards the top stationary body. In the meantime, the propeller is, however, building up a liquid pressure in the top slot, and the propeller is stabilised at the flattened portion of the curve. Due to the ability of the propeller proper to build up a stabilising liquid pressure, it will also not tip or reel and thereby be subjected to mechanical contacting with either stationary body.

I claim:

1. A device for the stabilisation of a body rotatably mounted in a liquid flow conduit and having its axis of rotation coinciding with the main direction of the liquid flow, comprising a pair of stationary bodies mounted in spaced relation to either end surface of the rotatable body in the said direction flow and each having a surface facing the adjacent surface of the rotatable body of essentially corresponding shape as the latter, so as to make adjacent surfaces define a narrow slot extending between the rotatable body and either of the two stationary bodies substantially radially to the said axis of rotation, the said rotatable body and at least one of the said two stationary bodies being provided with at least one bore extending generally parallelly to the said axis of rotation and the surfaces of the said rotatable body facing the slots having a substantially ribbed configuration wherein each rib extends substantially radially to the said axis of rotation, and the peripheral surface of the said rotatable body being provided with a number of projections of propeller blade shape, at least one of such projections being provided with a portion made of magnetic material situated in the part of the projection remote from the axis of rotation of the rotatable body.

2. A device for the stabilisation of a body rotatably mounted in a liquid flow conduit and having its axis of rotation coinciding with the main direction of the liquid flow, comprising a pair of stationary bodies mounted in spaced relation to either end surface of the rotatable body in the said direction flow and each having a surface facing the adjacent surface of the rotatable body of essentially corresponding shape as the latter, so as to make adjacent surfaces define a narrow slot extending between the rotatable body and either of the two stationary bodies substantially radially to the said axis of rotation, the said rotatable body and at least one of the said two stationary bodies being provided with at least one bore extending generally parallelly to the said axis of rotation, and the surfaces of the said rotatable body facing the slots having a substantially ribbed configuration wherein each rib extends substantially radially to the said axis of rotation, the rotatable body being equipped so as to act as the rotor of an electric motor, the stator structure of which is arranged in a stationary structure surrounding the device.

3. A bearing structure, adapted to support a rotatable, shaftless body in an axially and radially stabilized condition, comprising a tubular member of substantially rectilinear axis, a pair of stationary members situated in axial alignment within the said tubular member in axially spaced relation to each other and in radially spaced relation to the interior wall surface of the said tubular member, a freely rotatable third member situated in axial alignment with the first mentioned pair of members in the axial space between the same and radially spaced from the interior wall surface of the said tubular member, the axial length of the said third member being at all points less than the width of the said axial space, the axial surfaces of the two stationary members and of the rotatable member facing each other being conical and substantially parallel, wherein at least two of said members are provided with axial bores opening into the said axial space, and each of the two axial surfaces of the rotatable member is provided with groove-defining ribs extending substantially radially from the said axial bore towards the radial space between the said three members and the interior wall surface of the said tubular member.

References Cited by the Examiner
UNITED STATES PATENTS

| 1,041,512 | 10/1912 | Rice | 308—9 |
| 2,081,063 | 5/1937 | Oliver | 308—9 |
| 2,535,695 | 12/1950 | Pezzillo | 103—87 |
| 2,570,682 | 10/1951 | Imbert | 308—9 |
| 2,854,298 | 9/1958 | Baumeister | 308—9 X |

ROBERT M. WALKER, *Primary Examiner.*